(12) United States Patent
De Bree

(10) Patent No.: US 9,402,339 B2
(45) Date of Patent: Aug. 2, 2016

(54) SOIL PROCESSING DEVICE FOR CREATING CAVITIES IN SOIL

(71) Applicant: REDEXIM HANDEL—EN EXPLOITATIE MAATSCHAPPIJ B.V., AC Zeist (NL)

(72) Inventor: Cornelius Hermanus Maria De Bree, Driebergen (NL)

(73) Assignee: REDEXIM HANDEL—EN EXPLOITATIE MAATSCHAPPIJ B.V., AC Zeist (NL)

( * ) Notice: Subject to any disclaimer, the term of this patent is extended or adjusted under 35 U.S.C. 154(b) by 0 days.

(21) Appl. No.: 14/440,392

(22) PCT Filed: Nov. 5, 2013

(86) PCT No.: PCT/EP2013/072989
§ 371 (c)(1),
(2) Date: May 4, 2015

(87) PCT Pub. No.: WO2014/068127
PCT Pub. Date: May 8, 2014

(65) Prior Publication Data
US 2015/0296696 A1    Oct. 22, 2015

(30) Foreign Application Priority Data

Nov. 5, 2012 (DE) ...................... 20 2012 010 495 U

(51) Int. Cl.
*A01B 45/02* (2006.01)
*F16F 3/087* (2006.01)

(52) U.S. Cl.
CPC ............. *A01B 45/023* (2013.01); *F16F 3/0873* (2013.01)

(58) Field of Classification Search
CPC ...... A01B 45/00; A01B 45/02; A01B 45/023; A01B 45/026; F16F 3/0873
USPC ....................................... 172/21, 22
See application file for complete search history.

(56) References Cited

U.S. PATENT DOCUMENTS 4,422,510 A * 12/1983 de Ridder ............ A01B 45/023
  172/21
6,003,613 A * 12/1999 Reincke ............... A01B 45/023
  172/21

(Continued)

FOREIGN PATENT DOCUMENTS

DE    10 2005 021025 A1    10/2006
EP     0 853 869 A1     7/1998
EP     1 210 853 A1     6/2002

OTHER PUBLICATIONS

International Search Report dated Apr. 25, 2014 from corresponding International Application No. PCT/EP2013/072989; 2 pgs.

*Primary Examiner* — Jamie L McGowan
(74) *Attorney, Agent, or Firm* — Maier & Maier, PLLC

(57) ABSTRACT

A soil processing device for creating cavities in soil, including a machine frame that can move in the direction of travel, and at least one drive unit that is mounted in the machine frame and moves at least one pivotally mounted piercing tool up and down in a substantially vertical direction. Before piercing into the soil, the piercing tool is in a starting position at a predefined piercing angle, whereas in the soil, the same performs a pivoting movement about a first pivot axis as a result of the machine frame moving in the direction of travel, said pivoting movement being superimposed on the up-and-down movement.

14 Claims, 4 Drawing Sheets

(56) References Cited

U.S. PATENT DOCUMENTS

Figure 1:
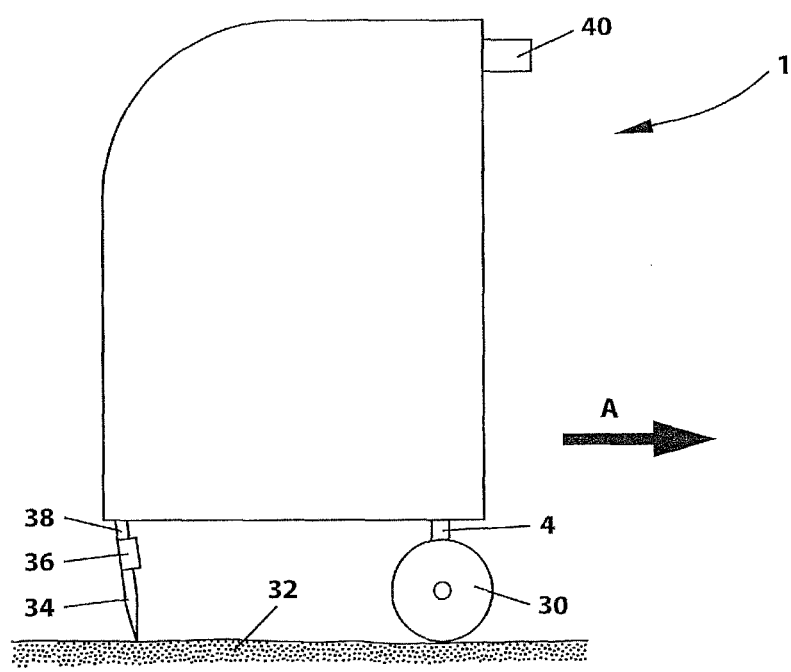

| | | | | |
|---|---|---|---|---|
| 8,051,917 B2 * | 11/2011 | Wiedenmann | A01B 45/023 172/21 |
| 8,291,992 B2 * | 10/2012 | de Bree | A01B 45/023 172/21 |
| 8,485,272 B2 * | 7/2013 | De Bree | A01B 45/023 172/125 |
| 2009/0200050 A1 * | 8/2009 | Bos | A01B 45/023 172/21 |
| 2010/0288518 A1 * | 11/2010 | Reincke | A01B 45/023 172/21 |

* cited by examiner

SOIL PROCESSING DEVICE FOR CREATING CAVITIES IN SOIL

The invention relates to a soil working device for creating cavities in soil.

Previously known soil working devices for creating cavities in soil comprise a machine frame adapted to be moved in the traveling direction and at least one drive supported in the machine frame, which drive moves at least one pivotably supported piercing tool up and down in a substantially vertical direction. Prior to piercing the soil, the piercing tool is in a home position under a predefined piercing angle, and, in the soil, the piercing tool performs a pivoting movement around a first pivot axis due to the movements of the machine frame in the traveling direction, which movement is superimposed on the up and down movement. Further, a return means coupled with the piercing tool and formed by a piston/cylinder unit is most often provided, which has a spring element acting on the piston rod of the piston/cylinder unit, the sprig element returning the piercing tool into the home position after the latter has left the soil. Further, a damping means is frequently provided that dampens the shock exerted by the piercing tool on the machine frame when hitting a stop that defines the home position.

However, there is an increasing need for soil working devices that can be operated at higher speeds. However, this also means that the impact loads on the machine frame are increased.

Therefore, it is an object of the invention to provide a soil working device in which the impacts on the machine frame are reduced.

The invention advantageously provides that at least one laterally projecting flange is arranged at the outer free end of the piston rod, which flange forms the damping means together with at least one corresponding flange arranged opposite thereto in the axial direction at the piston-side end of the cylinder unit, and together with at least one damping element arranged between the opposing flanges and fixed to one or the other flange.

Due to the damping element being arranged outside the cylinder unit, the damping element can be designed to be much larger so that impacts are damped better.

The damping means may comprise at least two damping elements. This offers the advantage of allowing a further reduction of the impact load.

The two damping element may be arranged diametrically opposite each other relative to the longitudinal axis of the piston/cylinder unit, i.e. relative to the axial direction.

The damping means may comprise at least three damping elements, the damping elements being arranged side by side at a mutual angular distance of 120°.

The at least one damping element may be detachably connected with the at least one flange of the cylinder element.

Upon an impact on the damping element, the at least one flange of the piston rod can hit the damping elements.

As an alternative, the at least one damping element may be detachably connected with the flange of the piston rod.

When hitting the at least one damper element, the flange of the cylinder unit may hit against the at least one damping element.

The at least one damping element may be releasably connected with the flange of the cylinder element or the piston rod through threaded and/or adhesive connection.

A compression spring may be arranged in the cylinder element, which is adapted to be compressed as the piercing tool is pivoted in the soil and exerts a restoring force on the tool holder when the tool no longer engages the soil, so that the piercing tool and the tool holder can be pivoted back to their home position.

The at least one damping element may be made of a material that includes plastic material, preferably rubber.

With respect to a horizontal direction extending orthogonally to the traveling direction, the piston/cylinder unit may be hinged to the tool holder at a central position.

The at least two damping elements may be fastened to a common flange of the cylinder unit or the piston rod.

The at least two damping elements may respectively be mounted on a single flange of the cylinder unit or may respectively be mounted on individual flanges of the piston rod.

The following is a detailed description of embodiments of the invention with reference to the drawings.

Figure 2:
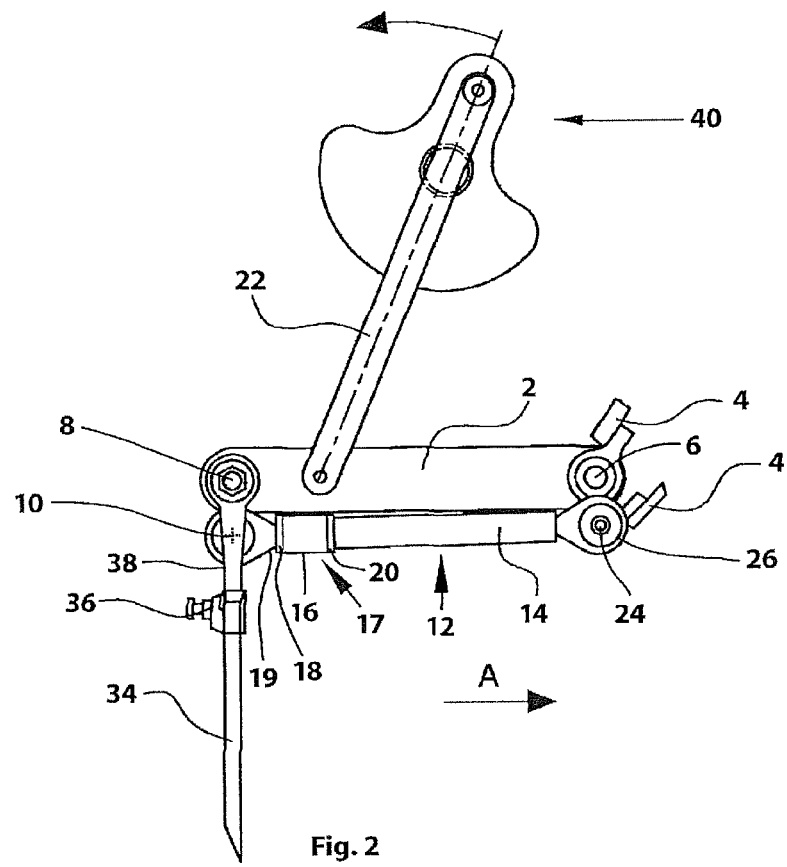
Figure 3:
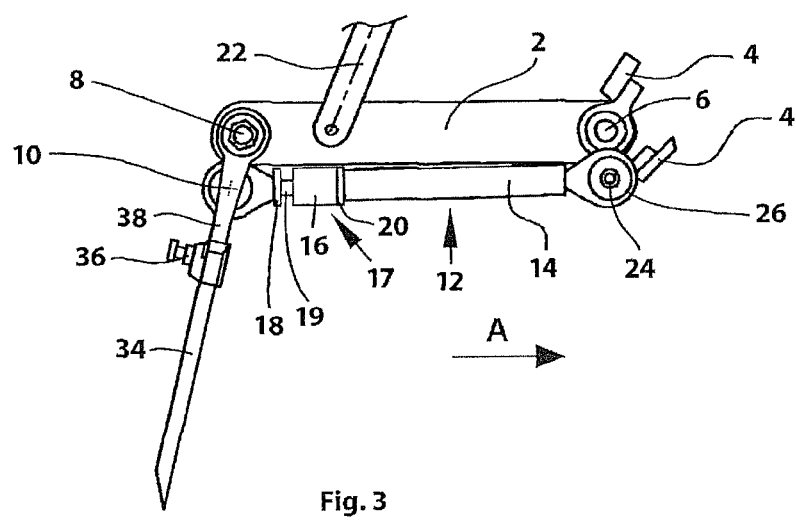
Figure 4:
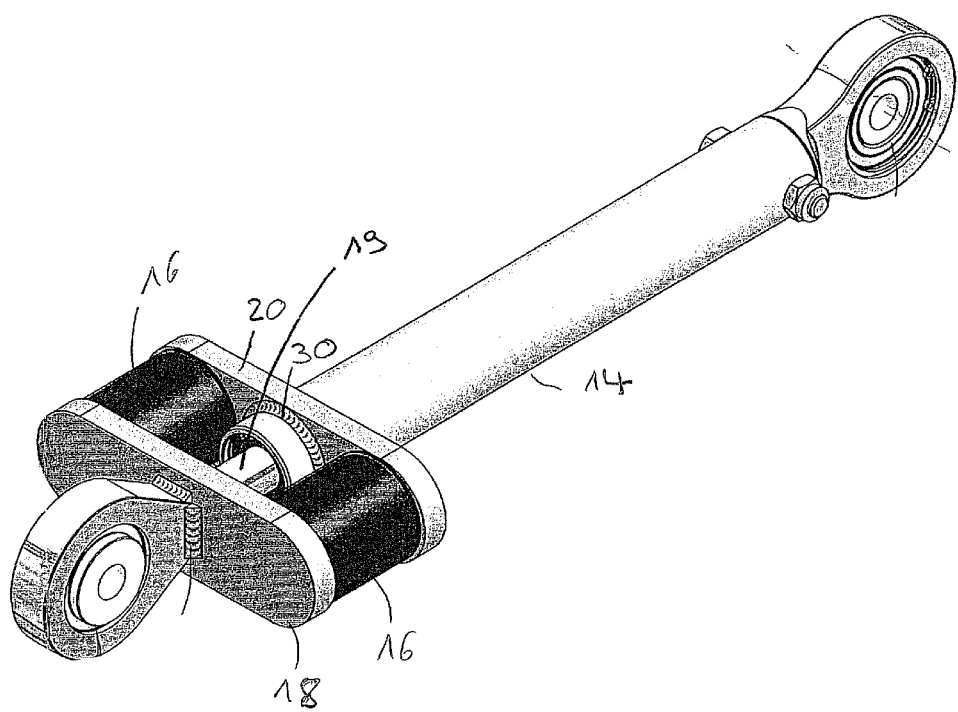
Figure 5:
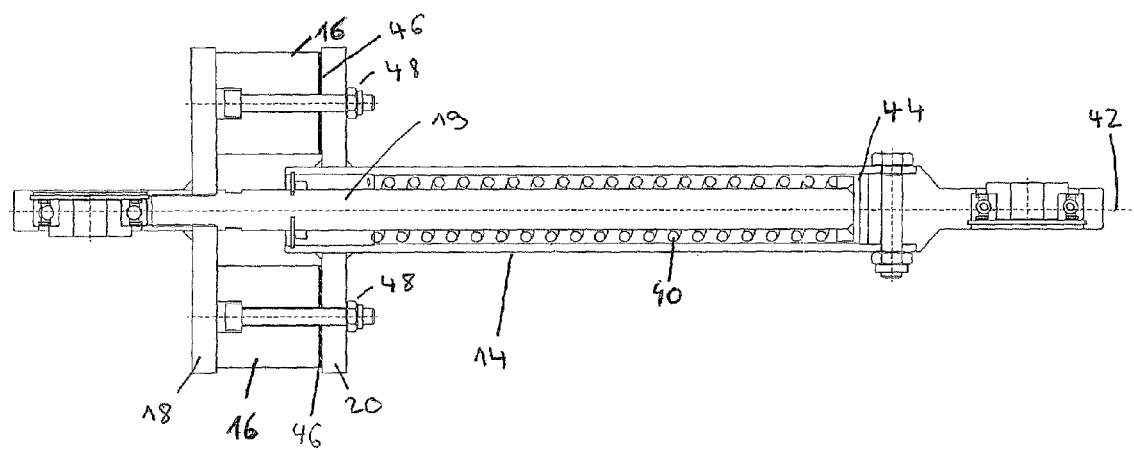

The Figures schematically show:

FIG. 1 a soil working device,

FIG. 2 a schematic illustration of the drive of the soil working device,

FIG. 3 the soil working device of FIG. 2 in another operating position,

FIG. 4 the spring damping element with a double damper,

FIG. 5 a section through the damping element in FIG. 4.

FIG. 1 shows the soil working device 1. The soil working device has a coupling element 40 via which the soil working device 1 can be towed by a towing vehicle. The soil working device 1 can be pulled over a ground surface 32 on wheels 30. The soil working device 1 has piercing tools 34 adapted to be pushed into the ground and be pulled out again.

FIG. 2 schematically illustrates the drive 40 for moving the piercing tools 34 up and down. The soil working device 1 has a crank drive 40 driving a pivot arm 2 via a pushrod 22. At a first end, the pivot arm 2 is supported at the machine frame 4 for pivotal movement about a second pivot axis 6. By being driven via the pushrod 22, the pivot arm 2 can thus be pivoted about the second pivot axis 6 and can perform an up and down movement. At the end of the pivot arm 2 opposite the first end of the pivot arm, a tool holder 38 is arranged supported for articulation about a first pivot axis 8, the tool holder also performing an up and down movement due to the up and down movement of the pivot arm 2.

At the tool holder 38, at least one piercing tool 34, preferably a set of piercing tools 34, is connected to the tool holder 38 through a fastening device 36.

A return means 12 is arranged beside the pivot arm 2, which means is supported, on the one hand, at the machine frame 4 for articulation about a pivot axis 24 and, on the other hand, it is supported at the tool holder 38 for articulation about a pivot axis 10. The return means 12 is a piston/cylinder unit. The cylinder unit 14 is hinged to the machine frame 4 via the pivot axis 24. The piston unit is a piston rod 19 which is articulately connected with the tool holder 38. In the cylinder unit 14, a compression spring is arranged which is compressed as the piston rod 19 is telescopically drawn from the cylinder element 14, and which exerts a restoring force on the piston rod 19.

Further, a damping means 17 is provided. At the outer free end of the piston rod 19, a laterally projecting flange 18 is arranged. At the cylinder unit 14, a corresponding flange 20 of the cylinder unit 14 is arranged at the piston-side end of the cylinder unit 14 opposite, seen in the axial direction, to the projecting flange 18 of the piston rod 19. The axial direction is the longitudinal direction 42 of the piston/cylinder unit. Between the two laterally projecting flanges 18, 20 of the piston rod 19 and the cylinder unit 14, two damping elements 16 are arranged that are fastened to the flange 18 of the piston rod 19 or to the flange 20 of the cylinder unit 14. The damping means 17 is formed by the flange 18 of the piston rod 19, the flange 20 of the cylinder unit 14 and the damping elements 16. In the embodiment illustrated, the damping elements 16 are detachably fastened to the flange 20 of the cylinder unit 14.

FIG. 2 illustrates a situation in which the piercing tool 34 is in a home position in which the piercing tool 34 is arranged under a predetermined piercing angle. When the piercing tool 34 is in the home position, the flange 18 rests on the damping elements 16 which thus form the stop.

After the piercing tool 34 has been pushed into the soil 32, the soil working device 1 is moved in the traveling direction A. The movement of the soil working device 1 causes the piercing tool 34 to be pivoted about the first pivot axis 8 together with the tool holder 38. FIG. 3 illustrates a pivoted position of the piercing tool 34. As can be seen in FIG. 3, when the piercing tool 34 is pivoted, the piston rod 19 is drawn out from the cylinder unit 14 against the spring force of the spring 40 arranged in the cylinder unit 14.

After the tool has been pulled from the soil, the piston rod 19 is pulled back into the cylinder unit 14 by the restoring force of the spring 40 so that the piercing tool 34 pivots back into the home position. When reaching the home position, the flange 18 hits against the damping elements 16. Owing to the fact that two damping elements 16 are provided, the soil working device 1 can be moved very quickly. In a fast operation, the impact force is very high. However, the relatively high impact force can be damped very well by the two damping elements 16. Further, it is an advantage that the damping elements are arranged outside the cylinders and can thus be replaced very easily.

In FIGS. 4 and 5, the piston/cylinder unit is illustrated together with the damping means 17. The damping means 17 comprises a flange 18, a flange 20 and two damping elements 16. The laterally projecting flange 18 is joined to the piston rod 19 via welding connections 32. The laterally projecting flange 20 is joined to the cylinder unit 14 by welding connections 30 as well. In the embodiment illustrated, the damping elements 16 are connected with the flange 20 of the cylinder unit 14. These are connected with the flange 20 via an adhesive and/or threaded connection 46, 48. As an alternative, the damping elements 16 can also be connected with the flange 18 of the piston rod 19.

The damping elements 16 illustrated are arranged diametrically opposite each other with respect to the longitudinal axis 42 of the piston/cylinder unit. This is particularly advantageous for the stability of the damping means 17.

The damping elements 16 illustrated are each fastened to an integral flange 20 of the cylinder unit 14. The flange 18 of the piston rod 19 is also a one-piece element. As an alternative, the flange 20 and the flange 18 could be designed as two-piece elements.

Likewise, more than two damping elements 16 may be provided; for, example, three damping elements could be provided. In this case, it is particularly advantageous if the damping elements are arranged at a mutual angular distance of 120°. These damping elements could each also be connected to an integral flange that is connected with the cylinder unit 14 or the piston rod 19, or a single flange could be provided for each damping element 16. As an alternative, it is also possible to provide more than three damping elements.

As a further alternative, only a single damping element could be provided which would however be so large that a first part and a second part of the damping element are arranged diametrically opposite with respect to the longitudinal axis 42 of the piston/cylinder unit. At the center, the damping element could be provided with a recess for the piston rod 19.

FIG. 5 illustrates the compression spring 40 arranged in the cylinder unit 14. The compression spring is compressed by the end element 44 of the piston rod as the piston rod 19 is drawn out from the cylinder unit 14. Thereby, a restoring force is exerted on the piercing tool 34 via the piston rod 19. As an alternative, the spring of the cylinder unit 14 could also be a tension spring that exerts a restoring force on the piercing tool 34.

The invention claimed is:

1. A soil working device for creating cavities in soil, comprising:
   a machine frame that can move in the direction of travel,
   at least one drive that is mounted in the machine frame and moves at least one pivotally mounted piercing tool up and down in a substantially vertical direction,
   wherein, before piercing into the soil, the piercing tool is in a home position at a predefined piercing angle, and, in the soil, performs a pivoting movement about a first pivot axis as a result of the machine frame moving in the direction of travel, said pivoting movement being superimposed on the up-and-down movement,
   a restoring means which is coupled to the piercing tool and comprises a piston/cylinder unit with a spring element that acts on the piston/cylinder unit and brings the piercing tool back into the home position once the latter has emerged from the soil, and
   a damping means which dampens the shock of the piercing tool against the machine frame when the piercing tool hits a stop defining the home position,
   wherein at least one laterally projecting flange is arranged at the outer free end of the piston rod, said flange forming the damping means together with at least one corresponding flange located at the axially opposite, piston-side end of the cylinder unit and at least one damping element that is located between the two opposite flanges and is secured to one or the other flange.

2. The soil working device of claim 1, wherein the damping means comprises at least two damping elements.

3. The soil working device of claim 1, wherein the two damping elements are arranged diametrically opposite each other with respect to the longitudinal axis of the piston/cylinder unit.

4. The soil working device of claim 1, wherein the damping means comprises at least three damping elements, the damping elements being arranged side by side at a mutual angular distance of 120°.

5. The soil working device of claim 1, wherein the at least one damping element is detachably connected with the at least one flange of the cylinder element.

6. The soil working device of claim 5, wherein, upon an impact of the at least one damping element, the at least one flange of the piston rod hits the at least one damping element.

7. The soil working device of claim 1, wherein the at least one damping element is detachably connected with the flange of the piston rod.

8. The soil working device of claim 7, wherein, when hitting the at least one damping element, the flange of the cylinder unit hits the at least one damping element.

9. The soil working device of claim 1, wherein the at least one damping element is detachably connected with the flange of the cylinder unit or the piston rod via threaded and/or an adhesive connections.

10. The soil working device of claim 1, wherein a compression spring is arranged in the cylinder unit, which can be compressed as the piercing tool pivots in the soil and which exerts a restoring force on the tool holder when the tool no longer engages the soil, so that the piercing tool and the tool holder can be pivoted back into the home position.

11. The soil working device of claim 1, wherein the at least one damping element is made of a material that includes plastic material, preferably rubber.

12. The soil working device of claim 1, wherein piston/cylinder unit is hinged to the tool holder at a central position with respect to a horizontal direction extending orthogonally to the traveling direction.

13. The soil working device of claim 1, wherein the at least two damping elements are fastened to a common flange of the cylinder unit or the piston rod.

14. The soil working device of claim 1, wherein the at least two damping elements are respectively fastened to a single flange of the cylinder unit or the piston rod.

* * * * *